United States Patent
Provenzano (10) Patent No.: US 10,830,658 B2
(45) Date of Patent: Nov. 10, 2020

(54) MULTI-CAVITY ALL-GLASS INTERFEROMETRIC SENSOR FOR MEASURING HIGH PRESSURE AND TEMPERATURE

(71) Applicant: Dan Raymond Provenzano, Blacksburg, VA (US)

(72) Inventor: Dan Raymond Provenzano, Blacksburg, VA (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 211 days.

(21) Appl. No.: 16/164,119

(22) Filed: Oct. 18, 2018

(65) Prior Publication Data

US 2019/0145249 A1   May 16, 2019

Related U.S. Application Data (60) Provisional application No. 62/584,393, filed on Nov. 10, 2017.

(51) Int. Cl.
*G01L 11/02* (2006.01)
*G01L 19/00* (2006.01)
(Continued)

(52) U.S. Cl.
CPC .......... *G01L 19/0092* (2013.01); *G01D 21/02* (2013.01); *G01K 11/32* (2013.01);
(Continued)

(58) Field of Classification Search
CPC .. G01L 19/0092; G01L 11/0025; G01L 11/02; G01D 21/02; G01K 11/32;
(Continued)

(56) References Cited

U.S. PATENT DOCUMENTS

| 4,945,230 A * | 7/1990 | Saaski ................. G01D 5/268 |
| | | 250/226 |
| 5,301,001 A * | 4/1994 | Murphy ............... G01B 11/22 |
| | | 356/35.5 |

(Continued)

FOREIGN PATENT DOCUMENTS

WO   2005024365 A2   3/2005

OTHER PUBLICATIONS

Notification of Transmittal of the International Search Report and the Written Opinion of the International Searching Authority, or the Declaration; International Application PCT/US2018/055815; Filing Date Oct. 15, 2018; dated Feb. 1, 2019; 15 pages.

*Primary Examiner* — Alexander A Mercado
(74) *Attorney, Agent, or Firm* — Cantor Colburn LLP (57) ABSTRACT

An apparatus for sensing pressure and temperature includes: a hollow glass tube; a first optical fiber having an end disposed into a first end of the tube; a second optical fiber being disposed in a second end of the tube, the second optical fiber having a first solid core section followed by a hollow core section followed by a second solid core section, a first gap formed between the first and second optical fibers, a length of the first solid core section forming a second gap, and a length of the hollow core section forming a third gap; an optical interrogator that transmits light at various wavelengths and measures an intensity of reflected light due to the first gap, second gap, and third gap as a function of frequency to provide interrogation data; and a processor that matches the interrogation data to reference data to estimate the pressure and/or temperature.

18 Claims, 6 Drawing Sheets

(51) Int. Cl.
  *F21V 8/00* (2006.01)
  *G01V 9/00* (2006.01)
  *G01K 11/32* (2006.01)
  *G01D 21/02* (2006.01)
  *E21B 47/06* (2012.01)
  *E21B 47/135* (2012.01)
  *E21B 47/07* (2012.01)

(52) U.S. Cl.
  CPC ............ G01L 11/025 (2013.01); G01V 9/005 (2013.01); G02B 6/0096 (2013.01); *E21B 47/06* (2013.01); *E21B 47/07* (2020.05); *E21B 47/135* (2020.05); *G01K 11/3206* (2013.01)

(58) Field of Classification Search
  CPC .............. G01K 11/3206; G01B 6/0096; G01B 6/3801; G01B 6/02309; G01B 6/262; G01V 9/005; E21B 47/135; E21B 47/07; E21B 47/06
  USPC ...................................................... 73/152.52
  See application file for complete search history.

(56) References Cited

U.S. PATENT DOCUMENTS

| | | | | |
|---|---|---|---|---|
| 5,345,519 A * | 9/1994 | Lu | .......................... | G01D 5/266 250/227.11 |
| 5,528,367 A * | 6/1996 | Putnam | .................. | G01B 11/18 356/35.5 |
| 5,682,237 A * | 10/1997 | Belk | ........................ | G01L 1/242 356/35.5 |
| 5,803,607 A * | 9/1998 | Jones | .................... | G01K 13/02 374/121 |
| 5,907,403 A * | 5/1999 | Andrews | ................ | G01D 5/266 356/35.5 |
| 5,963,321 A * | 10/1999 | Wang | ..................... | G01D 5/266 356/519 |
| 6,056,436 A * | 5/2000 | Sirkis | ................. | G01K 11/3206 356/32 |
| 6,563,970 B1 * | 5/2003 | Bohnert | ................. | G01L 9/0007 385/13 |
| 6,671,055 B1 * | 12/2003 | Wavering | ........... | G02B 6/29398 356/478 |
| 6,687,011 B1 | 2/2004 | Lee et al. | | |
| 7,104,141 B2 * | 9/2006 | Zerwekh | ............. | G01K 11/3206 374/E11.016 |
| 7,421,905 B2 * | 9/2008 | Zerwekh | ............. | G01K 11/3206 374/E11.016 |
| 8,558,994 B2 * | 10/2013 | Homa | ................. | G01K 11/3206 356/35.5 |
| 8,793,102 B2 * | 7/2014 | Childers | ............. | G01B 9/02025 702/179 |
| 9,766,099 B2 * | 9/2017 | Pechstedt | ........... | G01K 11/3206 |
| 2004/0047536 A1 * | 3/2004 | Pickrell | ................... | G01D 5/268 385/12 |
| 2005/0050962 A1 * | 3/2005 | Zerwekh | ............. | G01D 5/35312 73/800 |
| 2005/0185189 A1 * | 8/2005 | Grossman | .......... | G01D 5/35303 356/480 |
| 2007/0006663 A1 * | 1/2007 | Zerwekh | ................. | G01D 5/268 73/800 |
| 2007/0041019 A1 * | 2/2007 | Schmidt | ................. | G01L 9/0007 356/480 |
| 2007/0277974 A1 * | 12/2007 | DiFoggio | ................ | G01L 11/02 166/249 |
| 2008/0159687 A1 * | 7/2008 | Donlagic | .............. | G01P 15/093 385/13 |
| 2008/0232745 A1 * | 9/2008 | Knobloch | .............. | G02B 6/3624 385/88 |
| 2011/0172959 A1 * | 7/2011 | Childers | ............ | G01B 9/02025 702/179 |
| 2013/0083314 A1 * | 4/2013 | Lambourne | ........... | G01D 21/02 356/72 |
| 2015/0020599 A1 * | 1/2015 | Pechstedt | ................ | G01L 11/02 73/705 |
| 2016/0306073 A1 | 10/2016 | Choi et al. | | |
| 2019/0310077 A1 * | 10/2019 | Kishida | .............. | G01D 5/35364 |
| 2019/0391356 A1 * | 12/2019 | Bae | ........................ | G01L 11/02 |

* cited by examiner

MULTI-CAVITY ALL-GLASS INTERFEROMETRIC SENSOR FOR MEASURING HIGH PRESSURE AND TEMPERATURE

CROSS REFERENCE TO RELATED APPLICATIONS

This application claims the benefit of an earlier filing date from U.S. Provisional Application Ser. No. 62/584,393 filed Nov. 10, 2017, the entire disclosure of which is incorporated herein by reference.

BACKGROUND

Boreholes are drilled into earth formations for various purposes such as hydrocarbon production, geothermal production, and carbon dioxide sequestration. A sensor for measuring pressure and temperature may be disposed in a borehole such as between a tubular and a casing lining the borehole in order to provide data useful in a process or operation for utilizing the earth formation. The environment to which the sensor is exposed can be quite hazardous due to the typically high pressures and temperatures experienced downhole. Hence, it would be well received in industries making use of the earth formations if sensors for measuring pressure and temperature were developed to withstand the downhole environment and still provide accurate measurements.

BRIEF SUMMARY

Disclosed is an apparatus for sensing pressure and temperature. The apparatus includes: a hollow glass tube having a first end and a second end; a first optical fiber having an end disposed a first distance into the first end of the tube; a second optical fiber being disposed in the second end of the tube, the second optical fiber having a first solid core section followed by a hollow core section followed by a second solid core section, an end of the first solid core section being disposed a length from the end of the first optical fiber to form a first optical gap, a length of the first solid core section forming a second optical gap, and a length of the hollow core section forming a third optical gap; an optical interrogator coupled to another end of the first optical fiber and configured to transmit light at various wavelengths and to measure an intensity of light reflected from the first optical fiber due to the first optical gap, the second optical gap, and the third optical gap as a function of frequency to provide optical interrogation data; and a processor configured to match the optical interrogation data to reference data to estimate a value of at least one of the pressure and temperature.

Also disclosed is a method for sensing pressure and temperature. The method includes: transmitting light at varying wavelengths into a first optical fiber using an optical interrogator, the first optical fiber having an end disposed a first distance into the first end of the tube, a second optical fiber being disposed in the second end of the tube, the second optical fiber having a first solid core section followed by a hollow core section followed by a second solid core section, an end of the first solid core section being disposed a length from the end of the first optical fiber to form a first optical gap, a length of the first solid core section forming a second optical gap, and a length of the hollow core section forming a third optical gap; measuring an intensity of light reflected from the first optical fiber due to the first optical gap, the second optical gap, and the third optical gap as a function of frequency to provide optical interrogation data using the optical interrogator; and matching, using a processor, the optical interrogation data to reference data to estimate a value of at least one of the pressure and temperature.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Disclosed are embodiments of apparatuses and methods for sensing pressure and temperature in a borehole penetrating the earth. The apparatuses and methods involve using an optical sensor made of glass in order to withstand a harsh downhole environment having high pressures, which can be thousands of pounds per square inch (psi) and high temperatures, which can exceed 200° C. The sensor includes at least three gaps in an optical path that provides an intensity versus frequency response, which is used to sense the pressure and/or temperature.

Figure 1:
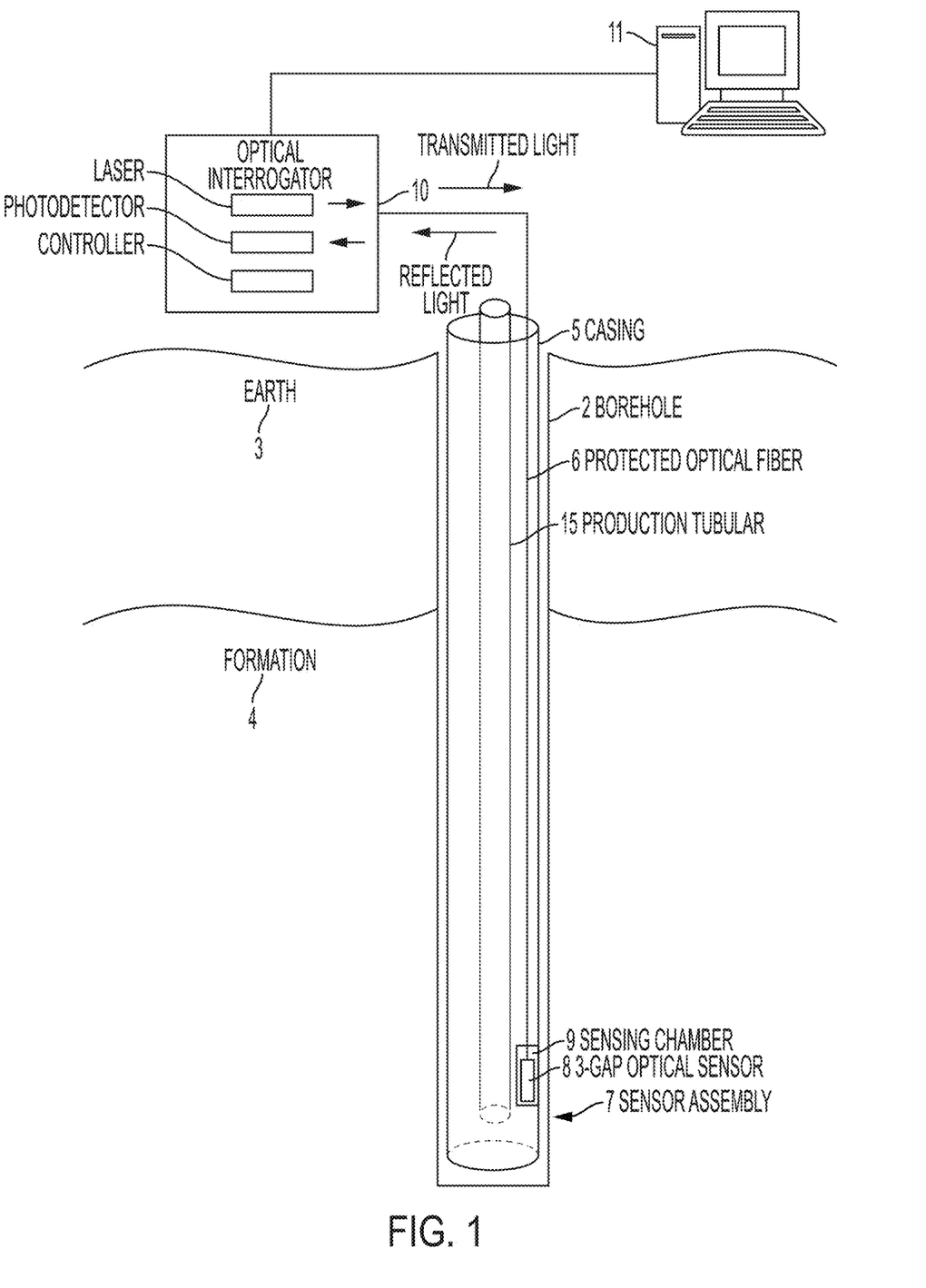
FIG. 1 is a cross-sectional view of an embodiment of a 3-gap optical sensor for measuring pressure and/or temperature disposed in a borehole penetrating the earth.

FIG. 1 illustrates a cross-sectional view of a borehole 2 penetrating the earth 3 having a formation 4. The borehole 2 is lined with a casing 5 that may be cemented in place. An optical waveguide referred to as an optical fiber 6 is disposed on a production tubular 15 disposed in the casing 5. Disposed at the distal end of the optical fiber 6 is a sensor assembly 7 configured to sense downhole pressure and temperature. The sensor assembly 7 includes a 3-gap optical sensor 8 disposed in a sensing chamber 9. The sensing chamber 9 is configured to protect the 3-gap optical sensor 8 from harsh chemicals and abrasion that may be experienced in a downhole environment and still allow transmission of the ambient downhole pressure and temperature for sensing purposes. For teaching purposes, the 3-gap optical sensor 8 includes three optical path gaps although in other embodiments the 3-gap optical sensor 8 may include more than three optical path gaps. The 3-gap optical sensor 8 is configured to interact with and sense the ambient downhole pressure and/or temperature in conjunction with an optical interrogator 10.

The optical interrogator 10 is in optical communication with the optical fiber 6. The optical interrogator 10 is configured to read the 3-gap optical sensor 8. Reading each sensor 8 includes varying a wavelength of transmitted light and measuring an intensity of light reflected by the sensor 8 as a function of wavelength to provide a response. The response may then be compared to a calibrated reference response to estimate the pressure and/or temperature sensed by the sensor 8. The comparison between the response and the calibrated reference response may be performed by the optical interrogator 10 or, alternatively, the response may be transmitted to a computer processing system 11 for the comparison. In one or more embodiments, the optical interrogator 10 may include a laser for transmitting light at various frequencies, either continuously or in steps, a photodetector for measuring an intensity of reflected light, and a controller for controlling operation of the optical interrogator 10 including processing and/or recording of received optical data.

Figure 2:
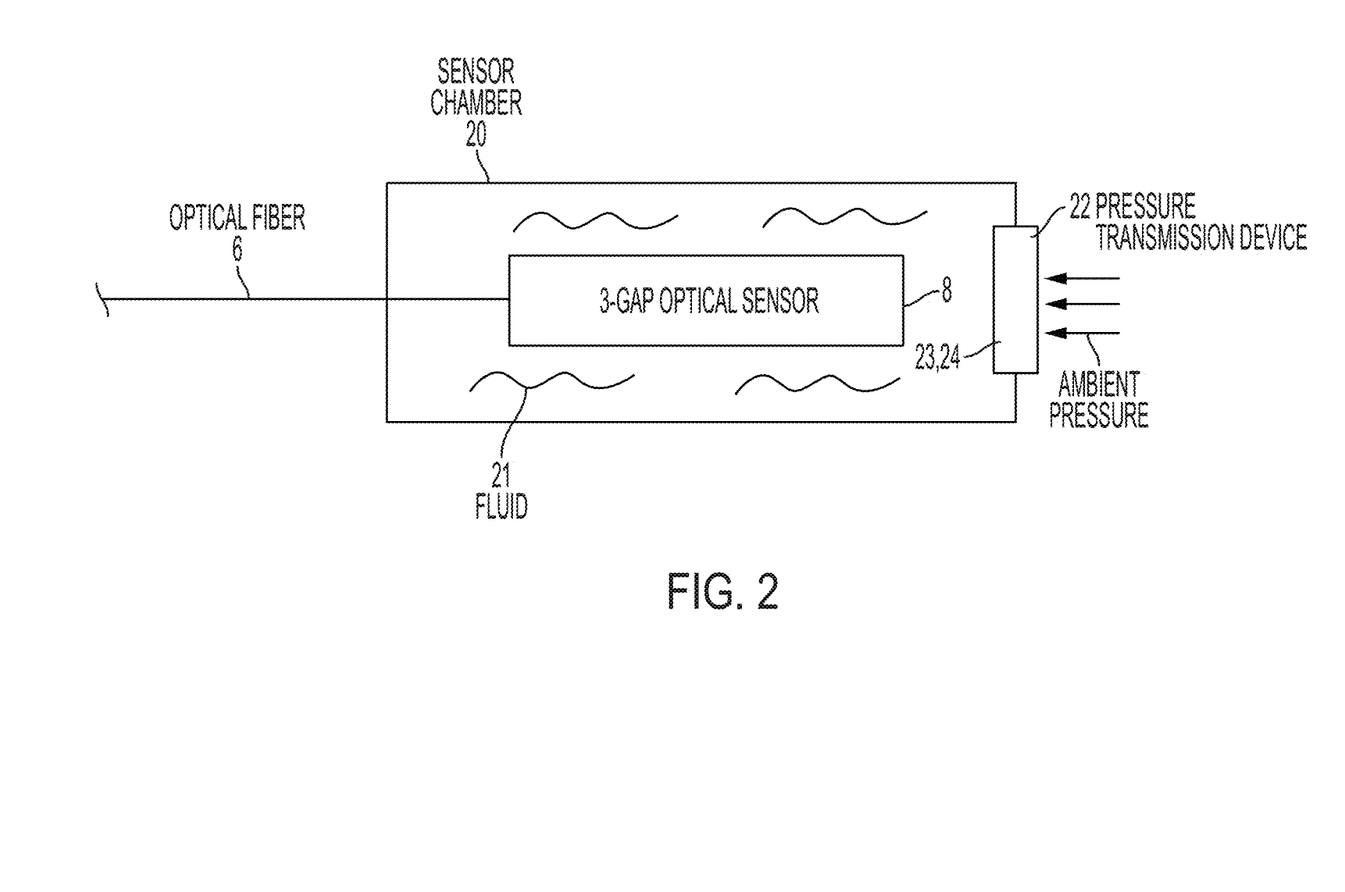
FIG. 2 depicts aspects of a sensor assembly for sensing downhole pressure and/or temperature.

FIG. 2 depicts aspect of the sensor assembly 7. The sensor assembly includes a sensor chamber 20 that contains a fluid 21. The 3-gap optical sensor 8 is immersed in the fluid 21. Walls of the sensor chamber 20 are made of a material, such as a metal in a non-limiting embodiment, which quickly transmits energy to or from the fluid 21 in order for the fluid 21 to stabilize at the ambient temperature. In one or more embodiments, the walls of the sensor chamber are made of Inconel. The sensor assembly 7 also includes a pressure transmission device 22 that is configured to transmit ambient temperature to the fluid 21. In one or more embodiments, the pressure transmission device 22 is a diaphragm 23 made of a flexible material, such as a rubber or polymer, or a thin metal such as Inconel, which can survive the harsh downhole environment. Alternatively in other embodiments, the pressure transmission device 22 is a piston 24 for transmitting ambient pressure to the fluid 21. In one or more embodiments, suitable fluids include (1) liquid metals such as Galinstan or Mercury, (2) fluorinated synthetic oils such as Krytox PFPE (perfluoropolyether) oils, and (3) dimethyl silicone fluids such as Xiameter PMX-0210 Silicone Fluid.

Figure 3:
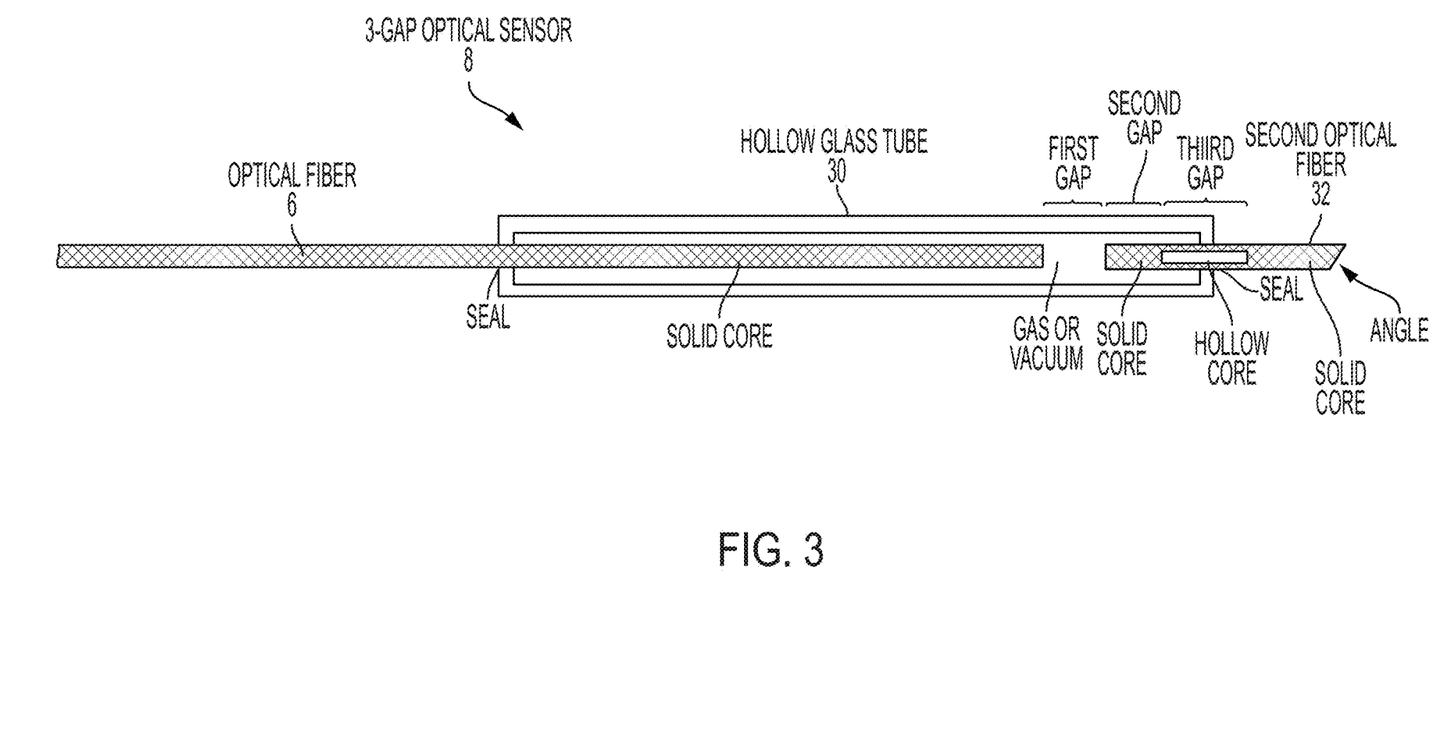
FIG. 3 depicts aspects of an embodiment of the 3-gap optical sensor.

FIG. 3 depicts aspects of an embodiment of the 3-gap optical sensor 8. An input waveguide such as the optical fiber 6 is disposed a defined distance into a hollow glass tube 30. In one or more embodiments, the outside diameter of the optical fiber 6 is less than the inside diameter of the hollow glass tube 30 such that the optical fiber 6 is not in contact with the tube 30. A first end of the tube 30 through which the optical fiber 6 enters is sealed against the optical fiber 6. In one or more embodiments, the seal is glass melted from the first end of the tube 30. A second optical fiber 32 is disposed a defined distance in a second end of the tube 30 such that a first gap is formed between the optical fiber 6 (may be referred to as the first optical fiber) and the second optical fiber 32 inside the tube 30. The end of the second optical fiber 32 in the tube 30 has a solid core for a defined length that itself forms a second gap. Following the solid core in the second optical fiber 32 is a hollow section having a defined length that forms a third gap. Following the hollow section is a solid core which terminates the other end of the second optical fiber 32. This other end is cut or formed such that a normal direction to the plane of the other end forms a non-zero angle with a longitudinal axis of the tube 30 or the second optical fiber 32 in order to eliminate or reduce reflections from the other end. In one or more embodiments, the outside diameter of the second optical fiber 32 is less than the inside diameter of the hollow glass tube 30 such that the second optical fiber 32 is not in contact with the tube 30. In one or more embodiments, the first gap is filled with a gas or contains a vacuum. Non-limiting embodiments of the gas include air or an inert gas such as nitrogen or Argon. Similarly, the hollow core of the third gap is filled with a gas (e.g., air or an inert gas such as nitrogen or Argon) or contains a vacuum. A second end of the tube 30 through which the second optical fiber 32 enters is sealed against the second optical fiber 32. In one or more embodiments, the seal against the second optical fiber 32 is glass melted from the second end of the tube 30. Because the third gap or optical cavity can be made of a hollow optical fiber, it avoids the effect of any stress-induced birefringence that an otherwise solid material would have as a result of the bonding fuse. Birefringence in an optical cavity is undesirable and any trace of birefringence would necessitate a much more complicated optical interrogator system. In order to keep the pressure sensitivity of the third gap or optical cavity very low, the bonding fuse or seal is placed on the third gap itself. In one or more embodiments, the first and/or second optical fibers a made of a high quality transparent silica glass. Table 1 presents parameters and properties of one embodiment of the 3-gap optical sensor 8 where n=index of refraction and L=actual length.

TABLE 1

|  | Gap 1 | Gap 2 | Gap 3 |
|---|---|---|---|
| Optical Cavity Material | Air | Glass Waveguide | Air |
| Optical Gap Length (nL) | 160 μm | 380 μm | 700 μm |
| Length Exposed to Pressure | 5 mm | 0 | 700 μm |
| Pressure Sensitivity | 1 μm/2700 psi | Little to none | 1 μm/19000 psi |
| Temperature Sensitivity (nL/dT) | Little to none | 1 μm/300° C. | 1 μm/1500° C. |

As can be seen from Table 1, the first optical gap (i.e., Gap 1) provides the most sensitivity to pressure to provide fine resolution measurements, while the third optical gap (i.e., Gap 3) provides much less sensitivity to pressure to provide coarse measurements, which have less resolution than the fine resolution measurements. The first and third optical gaps have little or no significant temperature sensitivity compared to the second optical gap (i.e., Gap 2). Consequently, the second optical gap is used to sense temperature. While the first optical gap has high pressure sensitivity, the high sensitivity provides for a repeating received optical data pattern or "fringe pattern." Pressure measurements using the first optical gap alone cannot provide the actual ambient pressure due to the repeating fringe pattern. Thus, the coarse pressure measurement provided by the third optical gap has a wide dynamic pressure range for sensitivity and can provide a coarse measurement of the actual ambient pressure. The coarse pressure measurement can therefore be used to identify the fringe pattern of interest in the plurality of repeating fringe patterns that represents the pressure range into which the actual ambient pressure falls. With the fringe pattern of interest identified, the ambient pressure measurement having fine resolution can be determined.

The second optical gap provides sensitivity to temperature due to thermal expansion of the glass and a change in the index of refraction of the glass in the second optical gap. In general, the change in the index of refraction is more temperature sensitive than the thermal expansion.

Figure 4:
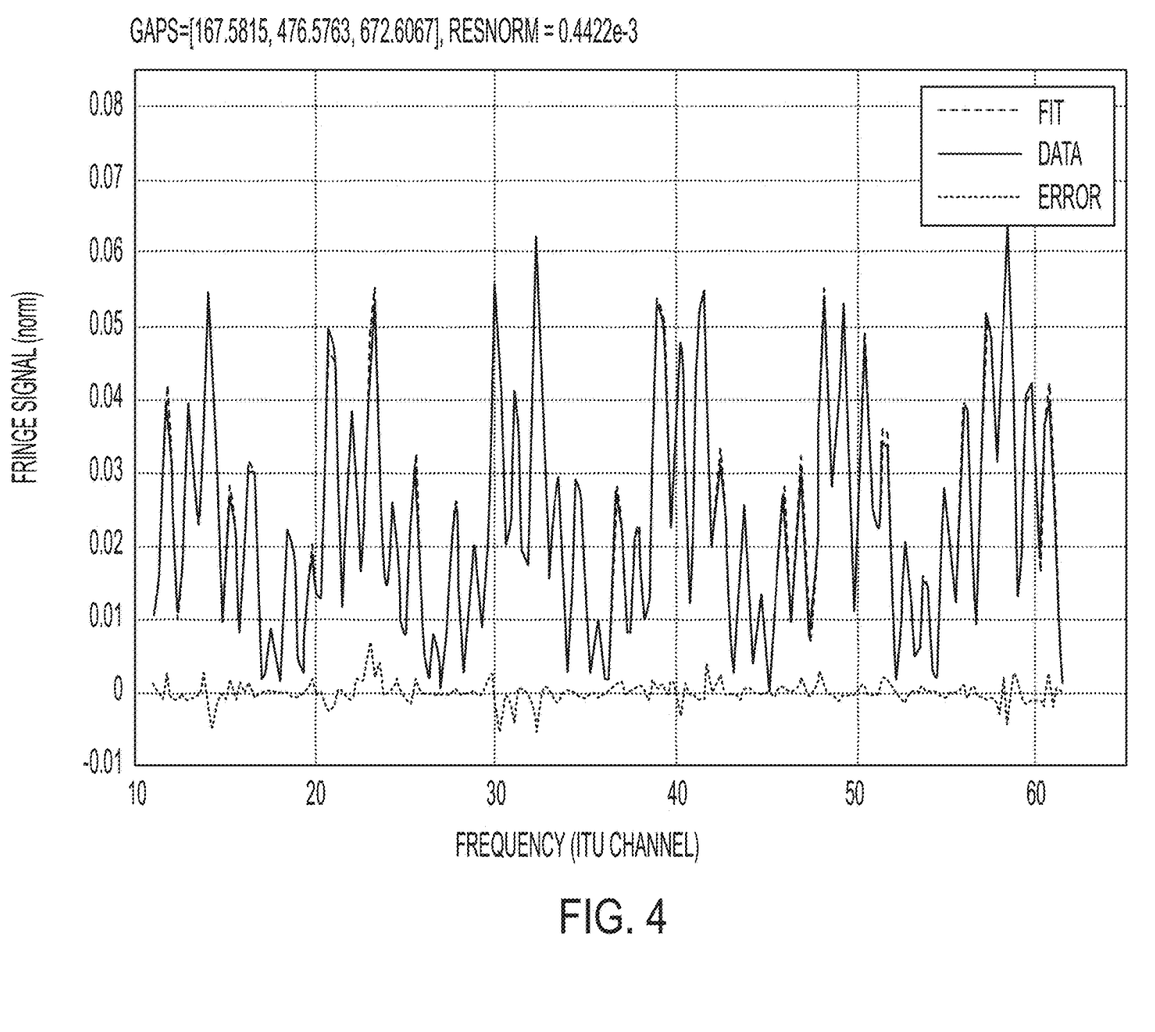
FIG. 4 depicts aspects of an optical signal received from the 3-gap optical sensor.

The optical frequency received by the optical interrogator is in general frequency dependent optical power or intensity which is converted to an electrical "fringe pattern" as illustrated in FIG. 4. The fringe pattern is then curve fit using an optical model of the optical path of the 3-gap optical sensor 8 and the lengths of each of the optical cavities or gaps are determined. The lengths of each of the optical cavities can thus provide a measurement of ambient pressure and temperature. In-factory calibration of cavity lengths versus known pressures and temperatures can build a calibration map or reference standard which can be used later to compare the extracted fringe patterns in an unknown pressure and/or temperature environment so that the cavity lengths and thus the pressure and temperature can be measured. In one or more embodiments, the optical model is a customized matrix transfer function, which models structures of cavities (i.e., gaps) and reflective surfaces in those cavities. Optical amplitude and phase for forward and reverse propagating light waves both in waveguides and free space are tracked using the optical model. Mathematical tools for optical wave propagation as known in the art are used in the matrix equation.

Figure 5:
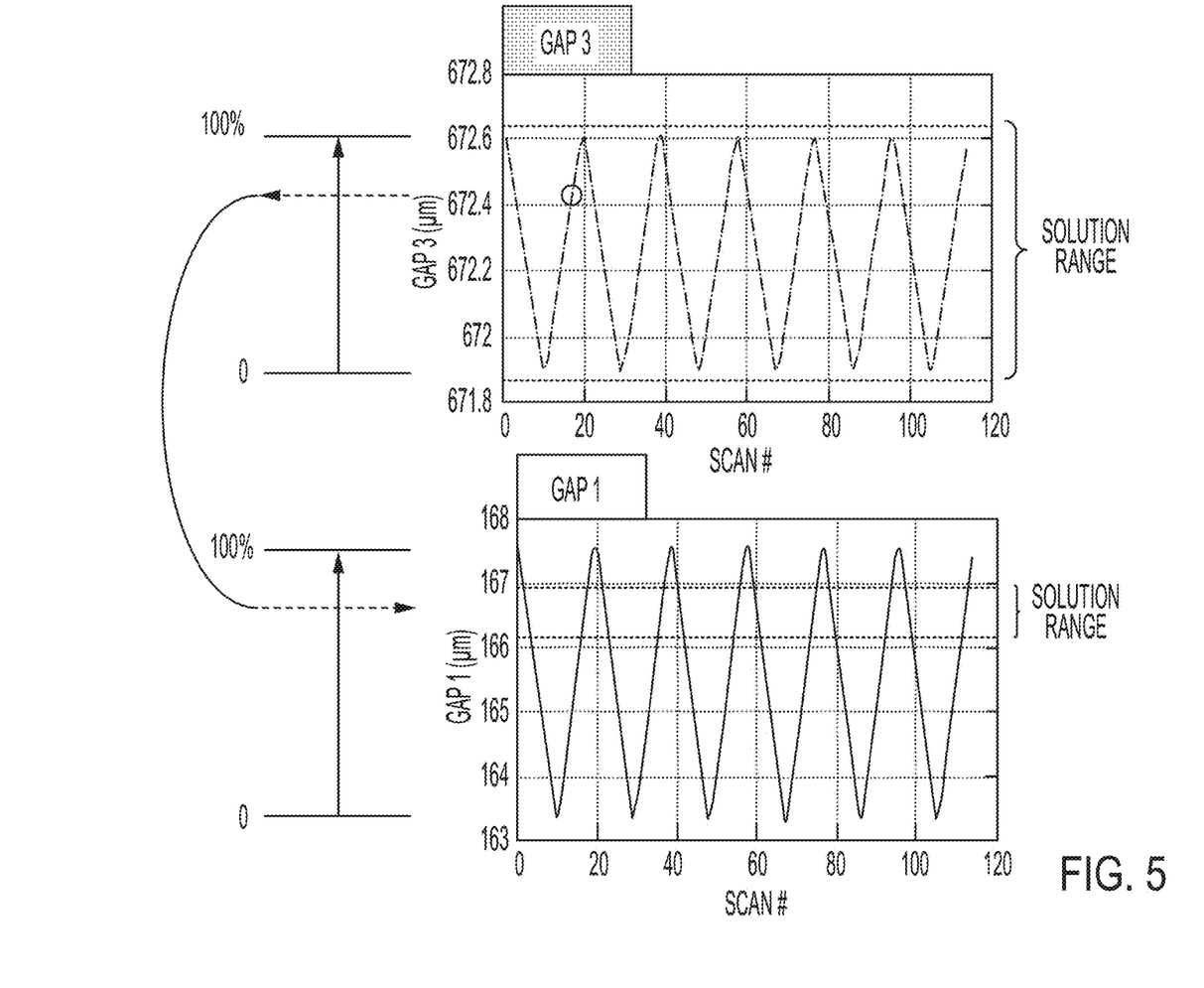
FIG. 5 depicts aspects of operation of the 3-gap optical sensor.

Next, an embodiment of operation of the 3-gap optical sensor 8 is discussed with respect to FIG. 5. First, a fringe pattern is taken and used to seed the optical model with the middle of each gap range to determine the gap lengths. Note that Gap 1 will be ambiguous because it has several potential solutions within the operating range or the length of Gap 1. Next, new seeds for the optical model are generated. (1) Gap 1 seed=scaled version of the Gap 3 fit value. Gap 2 can also be used to remove the temperature dependence of Gap 3. (2) Gap 2 seed=Gap 2 fit value. (3) Gap 3 seed=Gap 3 fit value. Next, the optical model is refit to obtain the correct gap length values. Finally, the correct gap length values are compared to a previously obtained calibration map of gaps (i.e., a reference map) to obtain the measured pressure and temperature.

Figure 6:
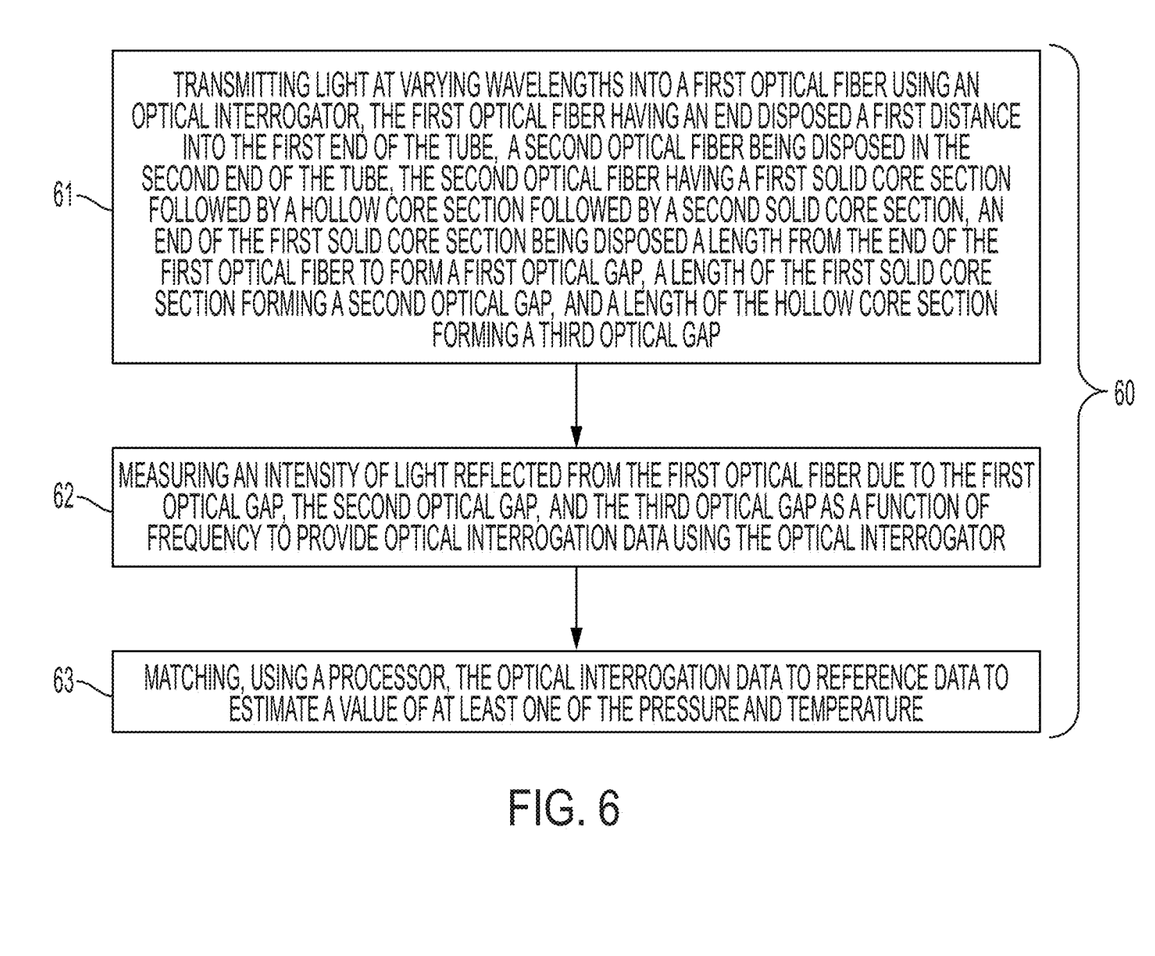
FIG. 6 is a flow chart for a method for sensing pressure and temperature in a borehole penetrating the earth.

FIG. 6 is a flow chart for a method 60 for sensing pressure and temperature. Block 61 calls for transmitting light at varying wavelengths into a first optical fiber using an optical interrogator, the first optical fiber having an end disposed a first distance into the first end of the tube, a second optical fiber being disposed in the second end of the tube, the second optical fiber having a first solid core section followed by a hollow core section followed by a second solid core section, an end of the first solid core section being disposed a length from the end of the first optical fiber to form a first optical gap, a length of the first solid core section forming a second optical gap, and a length of the hollow core section forming a third optical gap.

Block 62 calls for measuring an intensity of light reflected from the first optical fiber due to the first optical gap, the second optical gap, and the third optical gap as a function of frequency to provide optical interrogation data using the optical interrogator.

Block 63 calls for matching, using a processor, the optical interrogation data to reference data to estimate a value of at least one of the pressure and temperature. The matching may include determining that the optical interrogation data is within a defined range of the reference data.

In one or more embodiments, optical interrogation data may include the light reflections due to the third gap that are correlated to a value of pressure with coarse resolution over a selected pressure range without a repeating refection pattern; and light reflections due to the first gap that are correlated to a value of pressure with fine resolution over each of a plurality of pressure ranges that correlate to a plurality of repeating reflection patterns. In one or more embodiments, the method 60 includes selecting a reflection pattern in the plurality of repeating reflection patterns using the value of pressure with coarse resolution, the selected refection pattern having a pressure range that includes the coarse resolution pressure value in order to provide a value of actual pressure.

In one or more embodiments, the 3-gap optical sensor may be disposed on a carrier and be conveyed by the carrier through a borehole penetrating the earth. The term "carrier" as used herein means any device, device component, combination of devices, media and/or member that may be used to convey, house, support or otherwise facilitate the use of another device, device component, combination of devices, media and/or member. Other non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

The 3-gap optical sensor disclosed herein provides several advantages. One advantage is that the 3-gap optical sensor is made of glass, which can withstand the high pressures and temperatures that generally exist downhole, and thus provide accurate and consistent measurements. Another advantage is that the 3-gap optical sensor can be fabricated using existing optical glass fabrication material, techniques, and equipment.

Set forth below are some embodiments of the foregoing disclosure:

Embodiment 1

An apparatus for sensing pressure and temperature, the apparatus comprising: a hollow glass tube having a first end and a second end; a first optical fiber having an end disposed a first distance into the first end of the tube; a second optical fiber being disposed in the second end of the tube, the second optical fiber having a first solid core section followed by a hollow core section followed by a second solid core section, an end of the first solid core section being disposed a length from the end of the first optical fiber to form a first optical gap, a length of the first solid core section forming a second optical gap, and a length of the hollow core section forming a third optical gap; an optical interrogator coupled to another end of the first optical fiber and configured to transmit light at various wavelengths and to measure an intensity of light reflected from the first optical fiber due to the first optical gap, the second optical gap, and the third optical gap as a function of frequency to provide optical interrogation data; and a processor configured to match the optical interrogation data to reference data to estimate a value of at least one of the pressure and temperature.

Embodiment 2

The apparatus according to any prior embodiment, wherein a normal direction of an end of the second solid core section forms a non-zero angle to a longitudinal axis of the hollow glass tube.

Embodiment 3

The apparatus according to any prior embodiment, wherein the tube is sealed to the first optical fiber by a first seal at the first end of the tube and to the second optical fiber by a second seal at the second end of the tube.

Embodiment 4

The apparatus according to any prior embodiment, wherein the first seal and the second seal are formed by melted glass from the tube.

Embodiment 5

The apparatus according to any prior embodiment, wherein the first optical fiber and the second optical fiber are not in contact with the tube between the first end and the second end of the tube.

Embodiment 6

The apparatus according to any prior embodiment, wherein the first gap is filled with a gas or a vacuum.

Embodiment 7

The apparatus according to any prior embodiment, wherein the gas is air.

Embodiment 8

The apparatus according to any prior embodiment, wherein the hollow core section extends from within the tube to external to the tube.

Embodiment 9

The apparatus according to any prior embodiment, wherein the optical interrogation data comprises light reflections due to the second gap that are correlated to a value of temperature.

Embodiment 10

The apparatus according to any prior embodiment, wherein the optical interrogation data comprises light reflections due to the third gap that are correlated to a value of pressure with coarse resolution over a selected pressure range without a repeating refection pattern.

Embodiment 11

The apparatus according to any prior embodiment, wherein the optical interrogation data comprises light reflections due to the first gap that are correlated to a value of pressure with fine resolution over each of a plurality of pressure ranges that correlate to a plurality of repeating reflection patterns.

Embodiment 12

The apparatus according to any prior embodiment, wherein the processor is further configured to select a reflection pattern in the plurality of repeating reflection patterns using the value of pressure with coarse resolution, the selected refection pattern having a pressure range that includes the coarse resolution pressure value in order to provide a value of actual pressure.

Embodiment 13

The apparatus according to any prior embodiment, wherein the hollow glass tube is disposed in a borehole penetrating the earth.

Embodiment 14

A method for sensing pressure and temperature, the method comprising: transmitting light at varying wavelengths into a first optical fiber using an optical interrogator, the first optical fiber having an end disposed a first distance into the first end of the tube, a second optical fiber being disposed in the second end of the tube, the second optical fiber having a first solid core section followed by a hollow core section followed by a second solid core section, an end of the first solid core section being disposed a length from the end of the first optical fiber to form a first optical gap, a length of the first solid core section forming a second optical gap, and a length of the hollow core section forming a third optical gap; measuring an intensity of light reflected from the first optical fiber due to the first optical gap, the second optical gap, and the third optical gap as a function of frequency to provide optical interrogation data using the optical interrogator; and matching, using a processor, the optical interrogation data to reference data to estimate a value of at least one of the pressure and temperature.

Embodiment 15

The apparatus according to any prior embodiment, wherein the optical interrogation data comprises light reflections due to the second gap that are correlated to a value of temperature.

Embodiment 16

The method according to any prior embodiment, wherein the optical interrogation data comprises: light reflections due to the third gap that are correlated to a value of pressure with coarse resolution over a selected pressure range without a repeating refection pattern; and light reflections due to the first gap that are correlated to a value of pressure with fine resolution over each of a plurality of pressure ranges that correlate to a plurality of repeating reflection patterns.

Embodiment 17

The method according to any prior embodiment, further comprising selecting a reflection pattern in the plurality of repeating reflection patterns using the value of pressure with coarse resolution, the selected refection pattern having a pressure range that includes the coarse resolution pressure value in order to provide a value of actual pressure.

Embodiment 18

The method according to any prior embodiment, wherein the hollow glass tube is disposed in a borehole penetrating the earth.

In support of the teachings herein, various analysis components may be used, including a digital and/or an analog system. For example, the optical interrogator 10 and/or the computer processing system 11 may include digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured. The terms "first," "second" and the like are used to differentiate elements and are not intended to denote a particular order.

The flow diagram depicted herein is just an example. There may be many variations to this diagram or the steps (or operations) described therein without departing from the scope of the invention. For example, operations may be performed in another order or other operations may be performed at certain points without changing the specific disclosed sequence of operations with respect to each other. All of these variations are considered a part of the claimed invention.

The disclosure illustratively disclosed herein may be practiced in the absence of any element which is not specifically disclosed herein.

While one or more embodiments have been shown and described, modifications and substitutions may be made thereto without departing from the scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for sensing pressure and temperature, the apparatus comprising:
a hollow glass tube having a first end and a second end;
a first optical fiber having an end disposed a first distance into the first end of the tube;
a second optical fiber being disposed in the second end of the tube, the second optical fiber having a first solid core section followed by a hollow core section followed by a second solid core section, an end of the first solid core section being disposed a length from the end of the first optical fiber to form a first optical gap, a length of the first solid core section forming a second optical gap, and a length of the hollow core section forming a third optical gap;
an optical interrogator coupled to another end of the first optical fiber and configured to transmit light at various wavelengths and to measure an intensity of light reflected from the first optical fiber due to the first optical gap, the second optical gap, and the third optical gap as a function of frequency to provide optical interrogation data; and
a processor configured to match the optical interrogation data to reference data to estimate a value of at least one of the pressure and temperature.

2. The apparatus according to claim 1, wherein a normal direction of an end of the second solid core section forms a non-zero angle to a longitudinal axis of the hollow glass tube.

3. The apparatus according to claim 1, wherein the tube is sealed to the first optical fiber by a first seal at the first end of the tube and to the second optical fiber by a second seal at the second end of the tube.

4. The apparatus according to claim 3, wherein the first seal and the second seal are formed by melted glass from the tube.

5. The apparatus according to claim 1, wherein the first optical fiber and the second optical fiber are not in contact with the tube between the first end and the second end of the tube.

6. The apparatus according to claim 1, wherein the first gap is filled with a gas or a vacuum.

7. The apparatus according to claim 6, wherein the gas is air.

8. The apparatus according to claim 1, wherein the hollow core section extends from within the tube to external to the tube.

9. The apparatus according to claim 1, wherein the optical interrogation data comprises light reflections due to the second gap that are correlated to a value of temperature.

10. The apparatus according to claim 1, wherein the optical interrogation data comprises light reflections due to the third gap that are correlated to a value of pressure with coarse resolution over a selected pressure range without a repeating refection pattern.

11. The apparatus according to claim 10, wherein the optical interrogation data comprises light reflections due to the first gap that are correlated to a value of pressure with fine resolution over each of a plurality of pressure ranges that correlate to a plurality of repeating reflection patterns.

12. The apparatus according to claim 11, wherein the processor is further configured to select a reflection pattern in the plurality of repeating reflection patterns using the value of pressure with coarse resolution, the selected refection pattern having a pressure range that includes the coarse resolution pressure value in order to provide a value of actual pressure.

13. The apparatus according to claim 1, wherein the hollow glass tube is disposed in a borehole penetrating the earth.

14. A method for sensing pressure and temperature, the method comprising:
- transmitting light at varying wavelengths into a first optical fiber using an optical interrogator, the first optical fiber having an end disposed a first distance into a first end of a hollow glass tube, a second optical fiber being disposed in a second end of the tube, the second optical fiber having a first solid core section followed by a hollow core section followed by a second solid core section, an end of the first solid core section being disposed a length from the end of the first optical fiber to form a first optical gap, a length of the first solid core section forming a second optical gap, and a length of the hollow core section forming a third optical gap;
- measuring an intensity of light reflected from the first optical fiber due to the first optical gap, the second optical gap, and the third optical gap as a function of frequency to provide optical interrogation data using the optical interrogator; and
- matching, using a processor, the optical interrogation data to reference data to estimate a value of at least one of the pressure and temperature.

15. The method according to claim 14, wherein the optical interrogation data comprises light reflections due to the second gap that are correlated to a value of temperature.

16. The method according to claim 14, wherein the optical interrogation data comprises:
- light reflections due to the third gap that are correlated to a value of pressure with coarse resolution over a selected pressure range without a repeating refection pattern; and
- light reflections due to the first gap that are correlated to a value of pressure with fine resolution over each of a plurality of pressure ranges that correlate to a plurality of repeating reflection patterns.

17. The method according to claim 16, further comprising selecting a reflection pattern in the plurality of repeating reflection patterns using the value of pressure with coarse resolution, the selected refection pattern having a pressure range that includes the coarse resolution pressure value in order to provide a value of actual pressure.

18. The method according to claim 14, wherein the hollow glass tube is disposed in a borehole penetrating the earth.

* * * * *